[11] 3,611,145

| [72] | Inventor | Ward F. O'Connor |
| | | Denville, N.J. |
| [21] | Appl. No. | 750,211 |
| [22] | Filed | Aug. 5, 1968 |
| [45] | Patented | Oct. 5, 1971 |
| [73] | Assignee | The Lummus Company |
| | | Bloomfield, N.J. |

[54] METHOD AND APPARATUS FOR THE SUPPRESSION OF NOISE IN PROCESS CONTROL SYSTEMS
10 Claims, 3 Drawing Figs.

[52] U.S. Cl. .................................... 325/65, 325/28, 325/473, 325/474, 325/477, 330/86;109
[51] Int. Cl. ........................................ H04b 1/10
[50] Field of Search ........................................ 330/69, 124, 126, 109, 110, 84, 86; 325/65, 42, 44, 324, 404, 473, 474–476, 28, 480; 307/229, 230

[56] References Cited
UNITED STATES PATENTS

| 2,692,333 | 10/1954 | Holmes | 330/69 |
| 2,793,246 | 5/1957 | Olive et al. | 330/126 |
| 3,493,738 | 2/1970 | Keller | 307/229 |
| 2,450,818 | 10/1948 | Vermillion | 325/476 |
| 2,901,609 | 8/1959 | Campbell | 330/109 |

Primary Examiner—Robert L. Griffin
Assistant Examiner—Albert J. Mayer
Attorney—Marn & Jangarathis ABSTRACT: A method of noise suppression and the apparatus therefor is provided wherein the distinctive rate of change of the noise signal is relied upon to achieve the isolation and suppression thereof. In one embodiment of the disclosed invention, the composite waveform including the noise and information component signals is applied to both a linear and a nonlinear signal transfer means. The nonlinear transfer means is designed so that it will only pass the entire magnitude of signal components having a relatively high rate of change and thus only the noise component is wholly passed thereby. Thereafter, the isolated noise component signal is subtracted from the composite waveform as passed by the linear transfer means and a substantially noise-free information signal is thereby obtained.

PATENTED OCT 5 1971　　　　　　　　　　　　　　　　　3,611,145

INVENTOR.
Ward F. O'Connor

BY

Marn & Jangarathis
ATTORNEYS

METHOD AND APPARATUS FOR THE SUPPRESSION OF NOISE IN PROCESS CONTROL SYSTEMS

This invention relates to noise suppression or noise cancellation methods and apparatus therefor and more particularly to a noise suppression or cancellation method and apparatus for use in conjunction with process control systems.

In standard processing systems today, the processing rate is generally controlled by independent means included within the processing systems which vary, modify and control the processing rate in accordance with an algorithm programmed therein. In addition, such independent means are continuously supplied with information signals from the batch then being processed by sampling and sensor mechanisms in communication with said batch and connected to the control means. The algorithm or working formula then causes such control means to act upon such information in controlling the rate of processing such that despite the varying characteristics of a given batch, a theoretically uniform result is obtained in each case.

Processing systems and particularly the control means therein in use today have not, however, performed up to their calculated expectations in providing uniform results because the information signals upon which the control means acts are not truly representative of the batch then in process. The failure in the past of such information signals to accurately represent the batch then in process stems chiefly from the presence of a noise level associated with the information signal which noise level in combination with the information signal causes the control means to act upon the distorted composite signal. Furthermore, as will be explained in more detail hereinafter, due to the nature of the batch-processing information signal, the control means may often be responding to only the noise level associated with or superimposed upon said information signal.

Prior art attempts to free the information signal from the contamination and distortion of such associated noise levels have generally resolved themselves into filtering, clipping, and/or digital-summing schemes, all of which have proved inadequate. The filtering techniques have proved to be generally unsuccessful because they introduce a transfer lag and an insertion loss which are detrimental to and slow the use of the information signals for measurement and/or control. The clipping techniques have failed because the noise level associated with the information signal is generally an alternating signal superimposed thereon and thus normally has substantial portions below the clipping level. Finally, the digital-summing techniques have proved to be generally unsatisfactory because the noise signals are random in nature and hence do not readily admit of averaging to zero about the component on which it is superimposed and their sum or integral does not thereby normally represent the information signal. Thus, the prior art has no generally successful mode of operation wherein the batch information signal may be isolated and presented without noise to the control systems.

Therefore, it is an object of the present invention to provide novel noise suppression or cancellation apparatus which allows an information signal to be isolated and presented to utilization apparatus connected thereto, substantially free from noise or other distorting characteristics which may cause faults or improper operation of such utilization apparatus. Various other objects and advantages of the invention will become clear from the following detailed description of an embodiment thereof, and the novel features will be particularly pointed out in connection with the appended claims.

In accordance with the invention, a particular characteristic of superimposed noise in general is relied upon to provide noise suppression or cancellation apparatus which enables the information signals to be presented to the utilization devices with the noise level substantially removed.

The invention will be more clearly understood by reference to the following detailed description of the exemplary embodiments thereof in conjunction with the accompanying drawings in which.

Figure 1:
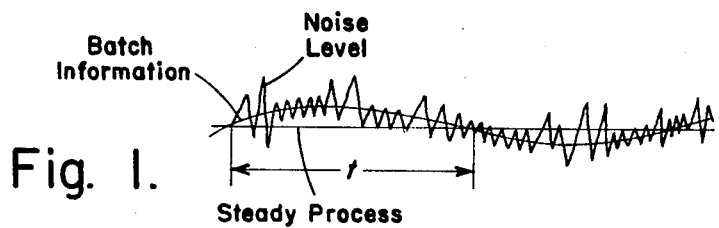
FIG. 1 is a diagrammatic showing of the ideal steady process waveform, the batch information waveform, and the superimposed noise level.

Referring to the drawings and more particularly to FIG. 1 thereof, there are shown three separate waveforms. The waveform-annotated steady process is indicative of the information signal which would be sensed from a properly run standardized batch and it is this waveform to which the algorithm of the control system will conform the sensed parameters of the batch presently in process. The waveform-annotated batch information is representative of the information signal which would be sensed from an actual batch in process and it is this information signal upon which the control system of the processing system should operate in conforming the actual batch parameters to the steady process waveform. The third waveform illustrated, and annotated noise level, is representative of the noise component which may normally be expected to be superimposed upon an actual batch information signal. Thus, a composite waveform made up of the noise level component waveform and the batch information component waveform is the signal normally transferred to the control system apparatus and acted upon by the algorithm programmed therein.

Automatic control in processing systems is generally based upon the sensing of a signal which is representative of the batch then in process and its rate of deviation or offset. This signal, illustrated as the batch information signal in FIG. 1, rarely constitutes a well-behaved curve and in actual practice may have a rate of offset ($t$) from the steady process waveform equal to from 4 seconds to 20 minutes. Thus, the batch information signal is a very slowly varying signal component which may be acted upon by the control circuitry to conform it to the steady process signal. The action of the control system is to normally vary, modify, and control the process such that the batch information signal is clamped about the steady process or ideal signal waveform. As the process progresses, further deviations of the batch information signal from the steady process signal are responded to by the control system such that the batch information signal is continuously conformed to the steady process signal. Such control systems should therefore consistently modify the process in accordance with its working formula to compensate fully for the individual peculiarities of a given batch and thereby such process systems should consistently turn out uniform products.

For the control system to properly act in the above-mentioned manner, it must receive batch information signals which are truly representative of the batch then in process. This, however, is rarely the case because the batch information signal will normally have a noise level component superimposed thereon. The noise component, as shown in FIG. 1, stems not only from electrical noise, which is normally repetitive and symmetrical, but in addition usually includes hydraulic, mechanical, process, and other dynamic noise components which are all characteristic in large processing systems. Each of these separate noise components, as generated by the above-described diverse sources, combine to form an associated noise level often described as a scratch overlay which is not symmetrical or otherwise characterized by repetitive behavior. Furthermore, such a scratch overlay or noise level may often comprise random spikes, as periodically shown in the noise level of FIG. 1, which re greatly upsetting to the control circuits of the overall control system and may periodically cause blanking out, overloading and/or overdriving.

Thus, in the normal processing system case, the composite batch information signal supplied to the control system comprises both the representative batch information signal component and a noise level or scratch overlay signal component superimposed thereon. Furthermore, when the batch is well behaved or has been corrected such that the amplitude of the offset is small, the control system may be responding almost solely to the noise level component superimposed thereon and therefore the corrections initiated thereby may be wholly erroneous.

An inspection of the noise level component, depicted in FIG. 1, superimposed upon the batch information signal, clearly indicated that the distorting effect thereof is so substantial that it must be removed from the composite batch information signal before the control system can operate properly. However, due to the random, unsymmetrical and substantial nature of the noise component, normal separation techniques have proved to be wholly inadequate when applied to the isolation of this waveform so that it can be thereafter subtracted from the composite waveform. This invention, however, stems from the recognition that despite the random, unsymmetrical and substantial nature of the noise component, such components consistently have one characterizing feature which can be relied upon to isolate the noise component so that algebraic summing techniques can be utilized to remove it from the composite batch information signal. This characteristic is that although the batch information signal component is a slowly varying signal of no fixed frequency and the noise level component or scratch overlay is a random, unsymmetrical signal of varying frequency, the rate of change of the noise level is normally very much greater than the rate of change of the batch information signal component. Accordingly, the substantial difference in the rates of change of each of the respective signal components is utilized to enable the noise level component to be isolated and thereafter algebraically removed from the composite waveform supplied to the control systems. A flow diagram illustrating the principals of a separation technique according to the instant invention is shown in FIG. 2.

Figure 2:
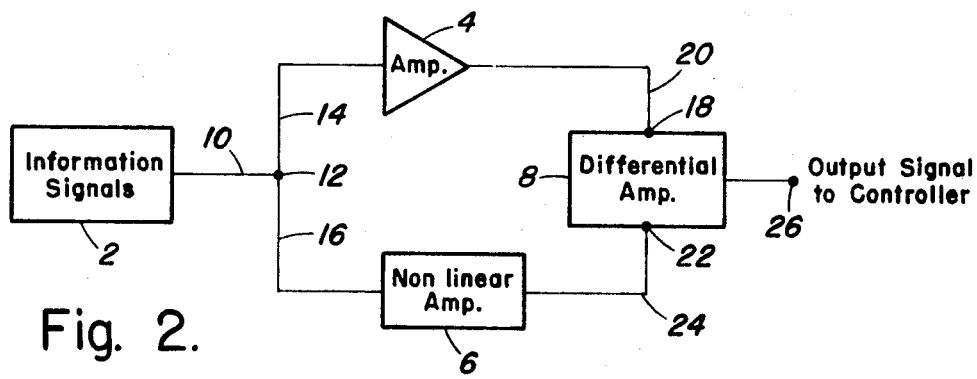
FIG. 2 is a flow diagram of a noise cancellation system according to the present invention.

The flow diagram depicted in FIG. 2 shows a source of input information signals 2, an amplifier means 4, a nonlinear amplifier means 6, and a differential amplifier 8. The source of input information signals 2 is representative of the sampling and sensor mechanisms in communication with the batch presently in process and supplies the batch information signal together with the superimposed noise level as shown in FIG. 1 to the input means 10. The precise form of the input means 10 will vary depending upon the physical makeup of the composite batch information signal which in turn will depend upon the type of apparatus included within the noise suppression apparatus. Thus, if the depicted noise suppression apparatus is electronic, input means 10 would be an ordinary conductor whereas if such noise suppression apparatus was fluidic or pneumatic, the input means would be a fluid communicating conduit of appropriate dimension.

The input means 10 is connected at junction 12 to the signal-communicating means 14 and 16 which take the same physical form as the input means 10. The signal-communicating means 14 is connected to the amplifying device 4 which is preferably a linear amplifying device and also may be either electronic, fluidic or pneumatic. The output of the linear amplifying device 4 is connected to a first terminal 18 of the differential amplifier 8 via line 20 which preferably takes the same form as the input means 10. The differential amplifier 8 may also be electronic, fluidic or pneumatic.

The signal-communicating means 16 is connected to the nonlinear amplifying device 6 which also may be electronic, fluidic or pneumatic depending upon the remaining parts of the system. The output of the nonlinear amplifying device 6 is connected to the second input terminal 22 of the differential amplifier 8 via the noise-signal-component-communicating line 24 which preferably takes the same form as the signal-communicating line 20. The nonlinear amplifier 6 is a member of the well-known class of amplifiers, generally denominated rate action or derivative amplifiers, which amplifier selectively amplify portions of the input thereto on the basis of the rate of change of said portion with respect to a selectable time constant.

In operation, the composite batch information signal, which constitutes both the batch information component and the superimposed noise level, is supplied by the source of input information signals 2 to he input which amplifiers 10. This signal is coupled via the junction 12 and the signal-communicating means 14 to the linear amplifying device 4. The linear amplifying device 4, which may constitute any of the well-known class of linear amplifiers, uniformly applies a suitable gain to the incoming composite batch information signal and thereafter presents this uniformly amplified signal to the signal-communicating line 20. The signal-communicating line 20 in turn applies the uniformly amplified composite batch information signal to a first terminal 18 of the differential amplifier 8 which functions in the well-known manner to provide at its output a signal representative of the difference between two signals applied to its inputs. The difference amplifier may comprise any of the well-known forms of such devices commonly available and used by those of ordinary skill in the art. Furthermore, although a difference amplifier has been shown, a summing device having a signal inverter or inverter amplifier connected to one input thereof could be readily substituted therefor.

The composite batch information signal is additionally coupled from the input means 10 to the input of the nonlinear amplifier 6 via junction 12 and the signal-communicating means 16. As previously mentioned, the nonlinear amplifier 6 is a rate action or derivative amplifier which, in the well-known manner, selectively amplifies portions of the input thereto on the basis of the rate of change of said portions with respect to a given time constant. The time constant is selectable, via the rate action control on the amplifier and thus the portions of the input to the nonlinear amplifier 6 having a substantially high rate of change with respect to said time constant can be selectively amplified whereas those portions having a low rate of change with respect to said time constant will not be present in the output thereof. For the purposes of explanation the composite bath information signal may be again treated as two discrete component waveforms which comprise the batch information signal and the superimposed noise level depicted in FIG. 1. Of these two component waveforms, the batch information signal will have a very low rate of change wherein the rate of offset ($t$) is commonly between 4 seconds and 20 minutes. In contradistinction thereto, the superimposed noise level has a relatively high rate of change with respect to the selected time constant as the minimum frequency thereof will comprise a 20-cycle component and the remaining components thereof will be much higher. Thus, since the rate of change of the noise level is relatively high, the noise level component or scratch overlay will be amplified by the nonlinear amplifier 6 and will be completely present in the output thereof. The batch information signal component is, however, a very low frequency component and conversely will not be present in the output of the nonlinear amplifier 6.

The output of the nonlinear amplifier 6 is applied to the second input terminal 22 of the differential amplifier 8 via the noise-signal-component-communicating device 24. Thus, the first input to the differential amplifier at input terminal 18 comprises both the batch information signal and the noise level component or scratch overlay while the second input thereto, at input terminal 22, comprises only the noise level component or scratch overlay. Therefore, when the two inputs at terminals 18 and 22 are subtracted by the difference amplifier 8 by adding the two inputs thereto with one input being shifted by 180°, the superimposed noise level present at both input terminals 18 and 22 will be cancelled and only the batch information signal component will be presented at the output terminal 26 for use by the control system ordinarily connected thereto.

As previously stated, each of the elements depicted in the flow diagram of FIG. 2 may be either electronic, fluidic or pneumatic in nature and each may comprise well-known, readily available components or modifications thereof. The nature of such elements is normally dictated by the needs of the particular system involve, the composition of the sampling or sensor mechanisms connected thereto, and the control system utilized therewith. Furthermore, where the need arises or expediency demands, transducer apparatus may be interposed between amplifier 4 and the differential amplifier input 18 and nonlinear amplifier 6 and the differential amplifier input 22, respectively, so that the differential amplifier 8 can be of a first type, for instance, electronic and the parallel amplifiers 4 and 6 can be of another type, for instance, fluidic.

Figure 3:
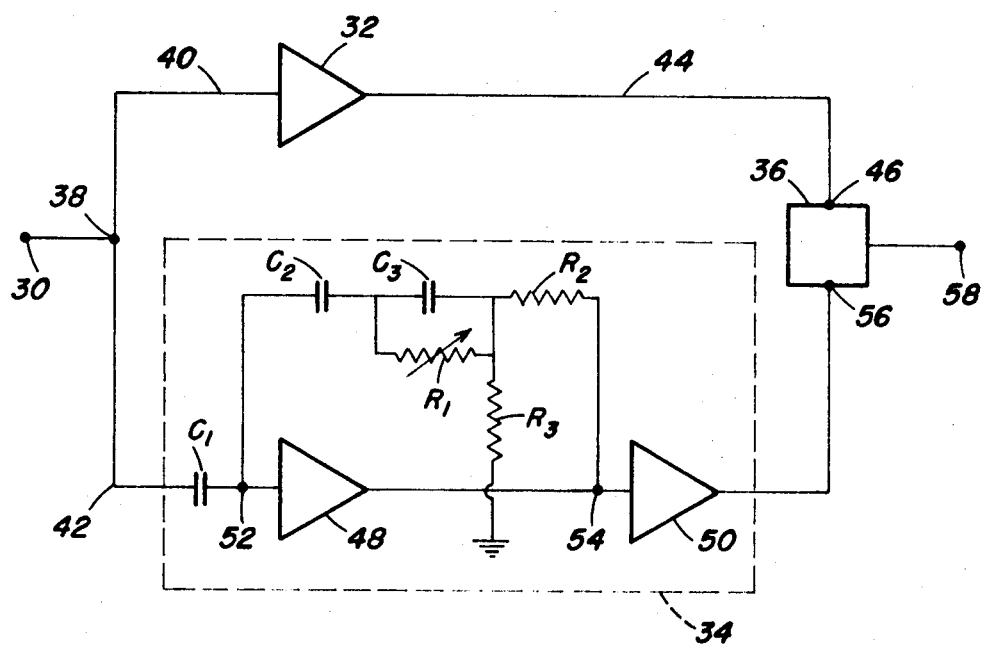
FIG. 3 is a schematic diagram of an electrical embodiment of a noise cancellation system according to the present invention.

Although the specific details of the elements shown in the flow diagram of FIG. 2 form no part of this invention, an exemplary electrical embodiment of the instant invention is shown in FIG. 3. The noise cancellation or suppression system depicted in FIG. 3 includes an input terminal means 30, a linear amplifier means 32, a nonlinear amplifying section 34, as indicated by the dashed block, and an algebraic-signal-combining means 36. The input terminal means 30 is coupled via the junction point 38 to the current-carrying conductors 40 and 42 connected to the input portions of the linear amplifier means 32 and the nonlinear amplifying section 34, respectively. The linear amplifier means 34 may taken any of the common forms of such devices which are well known to those of ordinary skill in the electronics arts and further can be a solid-state, tube or multiple-stage configuration. The output of the linear amplifier means 52 is connected via the conductor 44 to a first input terminal 46 of the algebraic-signal-combining means 36.

The nonlinear amplifying section 34 comprises an operational amplifier 48 and an output amplifier 50. The operational amplifier 48 has the usual input capacitor $C_1$ connected to its input terminal 52 and an ordinary feedback capacitor $C_2$ connected between its input terminal 52 and its output terminal 54. In addition, a rate action or derivative circuit comprising the capacitor $C_3$, an adjustable rate time resistor $R_1$, and a voltage-dividing network, including resistors $R_2$ and $R_3$, is provided within the feedback loop so that the operational amplifier will operate in the rate action or derivative mode. The output of the operational amplifier 48, as present that terminal 54 is applied to the output amplifier 50. The operational amplifier 48 and the output amplifier 50 are designed such that their overall gain will be somewhat less than the gain of the linear amplifier means 32. This design criteria is here preferred so that the tendency of the nonlinear amplifying means to accentuate the gain applied to random spikes will not cause the portions of the separated noise level to be larger than those present in the composite waveform.

The output of the nonlinear amplifying means 34 is applied to the second input 56 of the algebraic-signal-combining means 36. The output of the depicted noise cancellation or suppression circuit is thus available at the output terminal 58 of the algebraic-signal-combining means 36.

In operation, the noise suppression or cancellation circuit depicted in FIG. 3 receives at its input terminal means 30 the composite batch information signal, which constitutes both the batch information component and the superimposed noise level. This signal is supplied by the sampling and sensor mechanisms in communication with the batch presently in process, which mechanisms are normally connected to input terminal means 30 but here have not been shown. The composite batch information signal applied to the input terminal 30 is coupled via junction point 38 and line 40 to the linear amplifier means 32. The linear amplifier means 32 applies, in the well-known manner, a uniform gain to the composite batch information signal and this uniformly amplified signal is applied by the conductor 44 to a first input 56 of the algebraic-signal-combining device 36. Thus, a first input 46 of the algebraic-signal-combining device 36 receives the amplified composite batch information signal which includes a uniformly amplified information component and signal uniformly amplified superimposed noise level.

The composite batch information signal present at the input terminal means 30 is also applied via junction point 38 and line 42 to the input of the nonlinear amplifying section 34. The rate action or derivative mode amplifier therein which comprises the operational amplifier 48, the input capacitor $C_1$, the feedback capacitor $C_2$ and the rate action circuit which includes capacitor $C_3$, potentiometer $R_1$ and the voltage divider formed by resistors $R_2$ and $R_3$, is set to apply a substantial gain to signal components having a frequency which exceeds approximately 20 cycles per second (20 c.p.s.) while only an insignificant portion of the signal components having a lower frequency is passed. This is accomplished by the adjustment of the potentiometer $R_1$ so that the RC time constant of the rate action circuit in the feedback loop is such that signal components whose frequency exceeds 20 cycles per second will pass through the capacitor $C_3$ before said capacitor is charged but signal components of lower frequencies will be passed through the potentiometer $R_1$. This occurs because the impedance of capacitor $C_3$ is a frequency-dependent reactance which provides a relatively low impedance to the signal components whose frequency exceeds 20 cycles per second. Hence, capacitor $C_3$ provides a low impedance connection between feedback capacitor $C_2$ and the voltage divider formed by resistors $R_2$ and $R_3$, which results in an increase in he degree of amplification applied by the rate action amplifier to the signals applied thereto. When, however, the frequency of the signal components applied to the rate action amplifier is less than 20 cycles per second, the frequency-dependent reactance of capacitor $C_3$ provides a relatively high impedance to said signal components. Capacitor $C_3$ therefore charges through the potentiometer R, because the time constant $R_1 C_3$ is less than the inverse of the frequency of the signal components. Consequently, the degree of amplification applied by the rate action amplifier to the signals applied thereto is now decreased. Further, since the degree of charge on the capacitor $C_3$ is a function of time, the 20 cycles per second frequency cutoff is not a sharply defined cutoff, and hence the degree of amplification applied by the rate action amplifier to signals which exceed 20 c.p.s. will increase with higher frequencies of such components. Thus, the output of the rate action amplifier as presented at terminal 54 comprises substantially only noise components as the batch information signal component is essentially below 10 c.p.s.

As the output signal of the rate action amplifier presents at terminal 54 is 180° out of phase with the input thereto, due to the inverting characteristic of the amplifier shown, a reinversion of these signal components is desirable if the algebraic-signal-combining means 36 is to constitute a differential amplifier. This function may be achieved by the output amplifier 50 which may be additionally utilized to linearly increase the magnitude of an input signal applied thereto so that the total gain of the nonlinear amplifying section 34 is just below that of the linear amplifier 32. This is desirable so that noise spikes present in the superimposed noise level, due to their very high frequency, will not be amplified by the variable gain of the rate action amplifier with frequency in excess of those present in the linear amplifier channel. The output signal of the output amplifier 50 and thus the nonlinear amplifying section 34 is applied to the second input 56 of the algebraic-signal-combining means 36.

The algebraic-combining means 36, which in this case comprises a differential amplifier, is a device which in the well-known manner subtracts the two signals present at its inputs 56 and 56 and presents this difference signal at its output. Thus, since the input signal at input 46 comprises the batch information signal with the noise level superimposed thereon and the input signal at input 56 comprises essentially only the noise level, it will be seen that the output of the algebraic-signal-combining means will comprise essentially only the pure batch information signal component. This signal may then be applied to the control systems to thereby achieve accurate, positive control based on a true representation of the characteristics of the batch then in process.

Although the algebraic-signal-combining means 36 has here been disclosed as a difference amplifier, it will be obvious to those of ordinary skill in the art, that if the output amplifier 50 was not an inverting amplifier, the two signals applied would already be 180° out of phase and thus a summing circuit would be utilized as the algebraic-signal-combining means 36. This configuration would be useful in cases where the additional amplification of the output amplifier 48 was unnecessary.

Thus, it is seen that a first electrical embodiment of the instant invention has been provided wherein a batch information signal may be supplied to the control system which batch information signal is truly representative of the characteristics of the batch then in process.

A pneumatic or fluidic embodiment according to the teachings of the present invention could be assembled in similar manner to the disclosed electrical embodiment shown in FIG. 3 of the flow diagram depicted in FIG. 2. Thus, for instance, if such embodiments were desired, the commercially available elements listed in the chart below could be assembled in the configuration depicted in FIG. 2 at the location specified hereinafter:

Pneumatic Embodiment

| Circuit location specified in FIG. 2 | Element Model No., where each part is available from Moore Products Co. of Spring House, Pa. |
| --- | --- |
| Linear amplifier 4, | Model 60 BOOSTER PILOT VALVE, |
| Nonlinear amplifier 6, and | Model 59D Direct Action Derivative Unit followed by a Model 66BR6, 6 to 1 reducing relay, and |
| Differential amplifier 8. | Model 68WT17 differential-throttling relay where the diaphragms have been modified to provide 0—600 percent differential throttling. |

Fluidic Embodiment

| Circuit location specified in FIG. 2 | Element Model No., where each part is available from General Electric Co., Inc. |
| --- | --- |
| Linear amplifier 4, | Model AM-12 proportional gain block, |
| Nonlinear amplifier 6, and | Model FL-12 Dynamic Shaping Network, and |
| Differential amplifier 8. | Model FS12 Operational Amplifier. |

The above-listed elements are cited merely as examples and are in no way intended to limit the scope of this invention as a plurality of alternate embodiments will be readily apparent to one having ordinary skill in the pertinent art.

Thus, it can be seen that the present invention provides a method and apparatus for the removal of a superimposed noise level from a desired information signal so that such information signal is substantially free of distortion and truly representative of the information sought to be conveyed. Furthermore, although this invention has been disclosed in conjunction with processing systems and more particularly the control systems therefor, it will be apparent to those of ordinary skill in the art that the teachings of this invention are fully applicable to the selective removal of any superimposed signal which has a substantially different rate of change from the signal upon which it is superimposed. In addition, despite the use of the term "Batch" in connection with the controlled processing systems described herein, it should be apparent that this invention is equally applicable to other forms of processing systems, such as those using a continuous process for instance, and that the reference to a "Batch" process was as merely exemplary.

While the invention has been described in connection with a specific embodiment thereof, it will be understood that many modifications will be readily apparent to one of ordinary skill in the art, and that this application is intended to cover any adaptations or variations thereof. Therefore, it is manifestly intended that this invention be only limited by the claims and the equivalents thereof.

What is claimed is:

1. Noise suppression apparatus comprising:
    means adapted to receive an input signal including a first component having a relatively low rate of change and a second component having a relatively high rate of change;
    linear signal transfer means;
    nonlinear signal transfer means for selectively transferring input signal components applied thereto, said nonlinear transfer means applying a variable gain to signal components having a rate of change which exceeds a predetermined time constant and substantially attenuating signal components having a rate of change below said predetermined time constant;
    means for connecting said means adapted to receive an input signal to said linear signal transfer means and said nonlinear signal transfer means;
    means for comparing first and second signals and obtaining the algebraic difference therebetween: and
    means for connecting said linear signal transfer means and said nonlinear signal transfer means respectively to said comparing means, whereby an output signal constituting the algebraic difference between signals transferred by said linear signal transfer means and said nonlinear signal transfer means is obtained.

2. The apparatus of claim 1 wherein said nonlinear transfer means comprises a nonlinear amplifier and said linear transfer means comprises a substantially linear amplifier.

3. The apparatus of claim 2 wherein said nonlinear amplifier comprises rate action amplifying means.

4. The apparatus of claim 3 wherein said means for comparing first and second signals and obtaining the algebraic difference therebetween comprises a difference amplifier.

5. THe apparatus of claim 4 wherein said nonlinear amplifier, said linear amplifier and said difference amplifier are electronic.

6. The apparatus of claim 4 wherein said nonlinear amplifier and said linear amplifier are fluidic devices.

7. The apparatus according to claim 6 wherein said difference amplifier is a fluidic device.

8. The apparatus according to claim 4 wherein said nonlinear amplifier and said linear amplifier are pneumatic.

9. The apparatus of claim 8 wherein said difference amplifier is pneumatic.

10. The method of removing a superimposed noise signal from a composite waveform including the noise signal and an information signal comprising the steps of:
    applying said composite waveform to a linear signal transfer means and obtaining a first output therefrom which includes the noise signal and the information signal;
    nonlinearly transferring said composite waveform on the basis of the rate of change of the signal components therein with respect to a time constant such that signal components having a rate of change which exceeds said time constant are amplified and signal components having a rate of change below said time constant are substantially attenuated, and obtaining a second output which includes substantially only said noise signal; and
    subtracting said first and second outputs to obtain a signal substantially only including said information signal.

P/1612

PO-1050
(5/69)

UNITED STATES PATENT OFFICE
CERTIFICATE OF CORRECTION

Patent No. 3,611,145                    Dated  October 5, 1971

Inventor(s)  WARD F. O'CONNOR

It is certified that error appears in the above-identified patent and that said Letters Patent are hereby corrected as shown below:

Col. 2, lines 52-53: "above-mentioned" should be --above-described--.
Col. 2, line 68: "re" should be --are--.
Col. 3, line 9: "indicated" should be --indicates--.
Col. 3, lines 10-11: "in formation" should be --information--.
Col. 4, line 4: "he" should be --the--.
Col. 4, line 38: "bath" should be --batch--.
Col. 4, line 75: "involve" should be --involved--.
Col. 5, line 21: "taken" should be --take--.
Col. 5, line 38: "that" should be --at--.
Col. 5, line 66: "56" should be --46--.
Col. 5, line 70: "amplified information" should be --amplified batch information--.
Col. 5, lines 70-71: "and signal uniformly" should be --and th uniformly--.
Col. 6, line 20: "he" should be --the--.
Col. 6, line 41: "presents" should be --present--.
Col. 6, line 62: "56" (1st occurrence) should be --46--.
Col. 7, line 3 under "Preumatic Embodiment": "Spring House" should be --Spring Horse--.

Signed and sealed this 11th day of July 1972.

(SEAL)
Attest:

EDWARD M. FLETCHER, JR.          ROBERT GOTTSCHALK
Attesting Officer                Commissioner of Patents